UNITED STATES PATENT OFFICE.

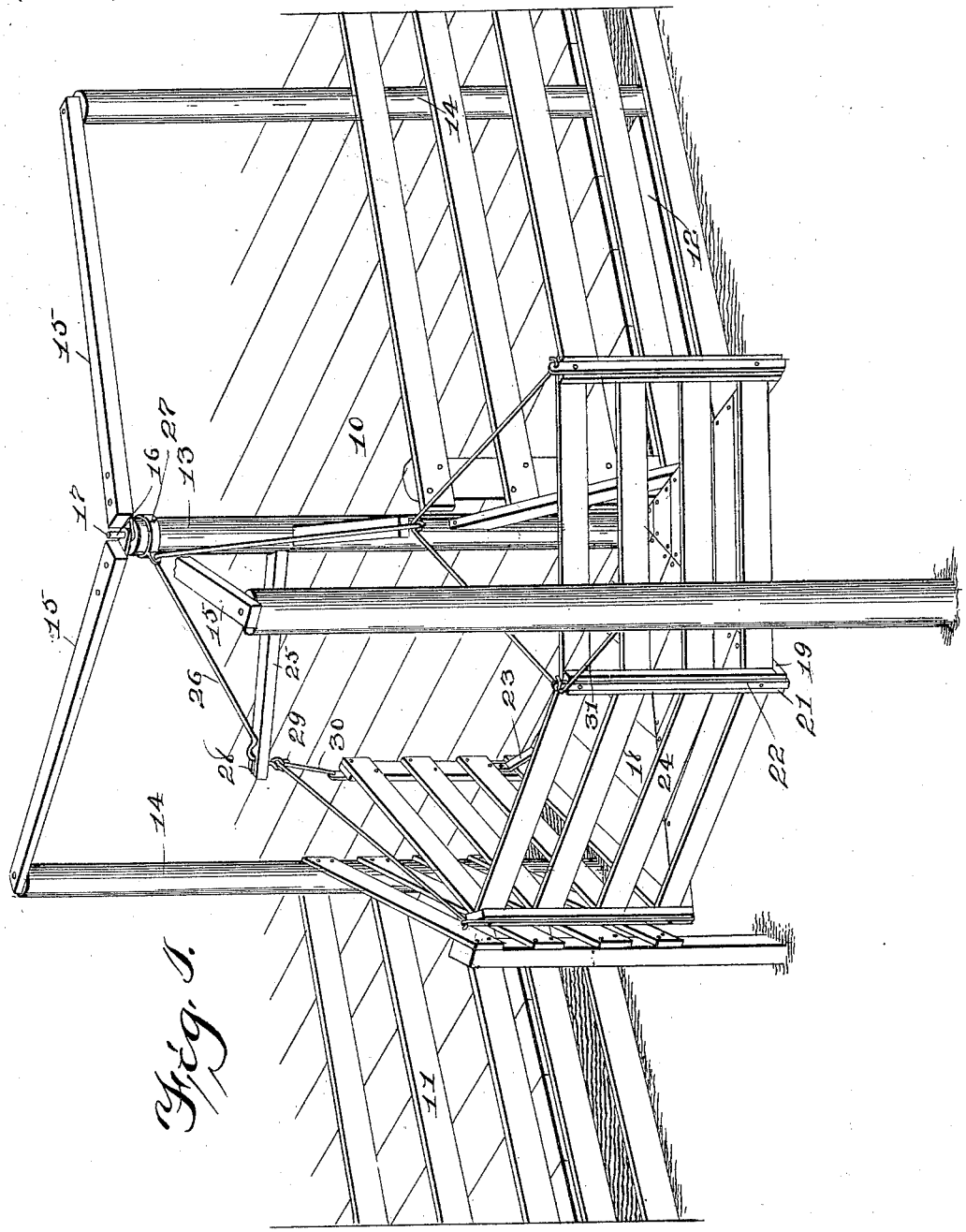

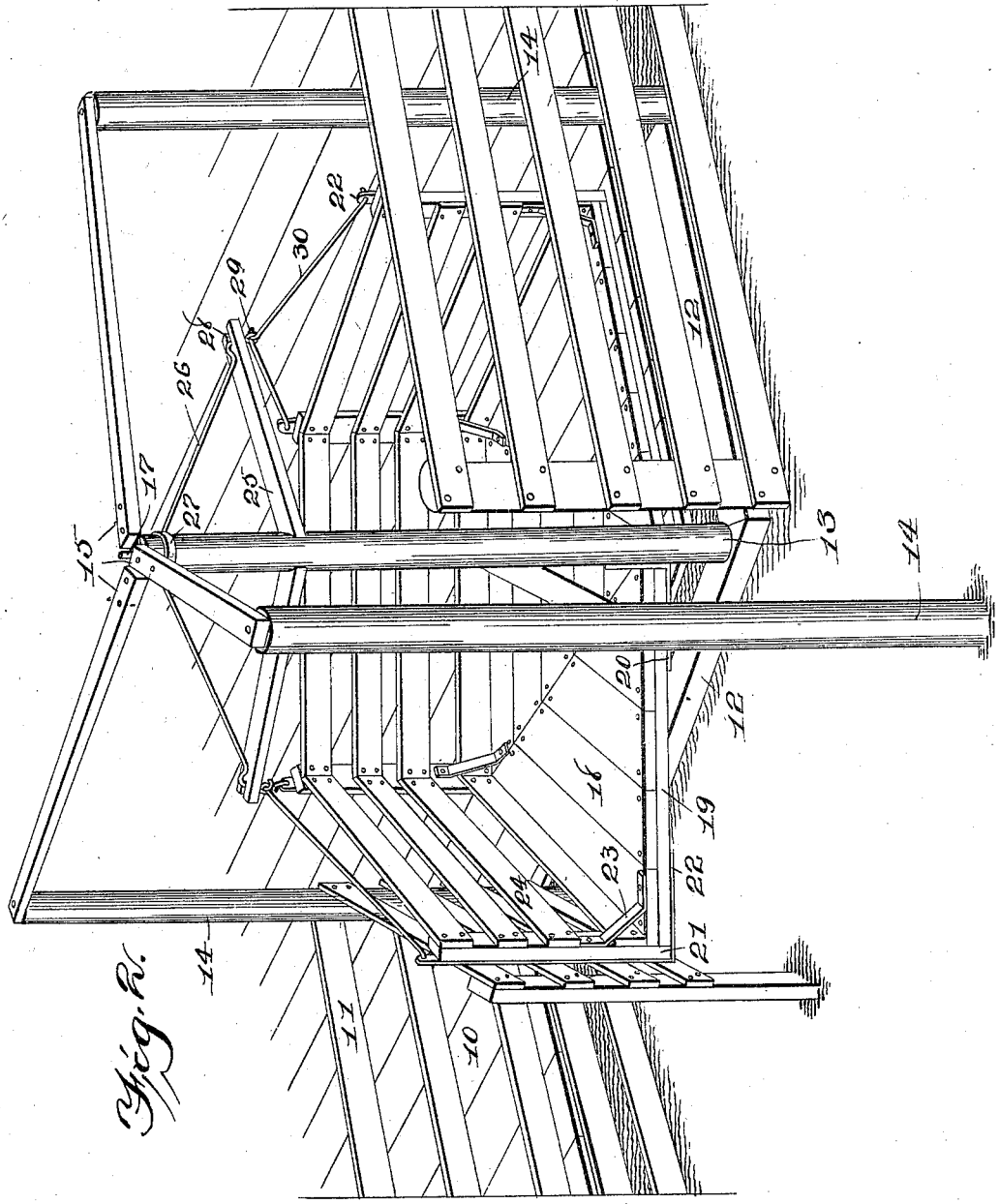

EPHRAIM MYERS, OF MURRAY, IOWA, ASSIGNOR OF ONE-HALF TO C. C. BANCROFT, OF BARNEY, IOWA.

SWINGING ANIMAL-CHUTE.

SPECIFICATION forming part of Letters Patent No. 705,118, dated July 22, 1902.

Application filed March 1, 1902. Serial No. 96,268. (No model.)

*To all whom it may concern:*

Be it known that I, EPHRAIM MYERS, a citizen of the United States, residing at Murray, in the county of Clarke, in the State of Iowa, have invented certain new and useful Improvements in Swinging Animal-Chutes, of which the following is a specification.

The objects of my invention are to provide a device of this class of simple, strong, and inexpensive construction that will always maintain a position on the same horizontal plane and which when in one position will prevent the passage of animals through the opening in the fence where the chute is located and which may be easily and quickly swung to a position with one end resting against the rear end of a wagon, so that animals may pass from the wagon over the chute and through the opening in the fence where the chute is applied, and, further, in this connection it is my object to provide a swinging animal-chute so arranged that a wagon loaded with animals may be driven up close to the opening in the fence, and then the swinging chute may be moved to a position against the back of the wagon without the necessity of backing the wagon toward the opening in the fence, thereby saving time and annoyance in getting the wagon into position for unloading.

My invention consists in the construction, arrangement, and combination, with a fence or inclosure, of a swinging chute applied to said fence or inclosure, whereby the objects contemplated are attained, as hereinafter more fully set forth, pointed out in my claims, and illustrated in the accompanying drawings, in which—

Figure I shows in perspective a portion of the stock-yard inclosure having my improved swinging animal-chute applied thereto and shown in position ready for loading or unloading animals from a wagon. Fig. II shows a like view of the swinging chute in its closed position.

Referring to the accompanying drawings, I have used the reference-numeral 10 to indicate the raised floor or platform of the stock-yard or inclosure. This platform is surrounded by a fence 11, having an opening or a gateway therein. Near this opening or gateway is a sill 12, and rotatively mounted upon said sill near one side of the opening in the gateway or fence is a standard 13. The upper end of the standard is rotatively supported in its upright position by means of the posts 14, connected with the standard 13 by means of the bars 15, each bar having at its end a metal strap 16, pivoted to a central upwardly-projecting pin 17 on the standard. By this means the said standard is rotatively supported in an upright position.

The reference-numeral 18 indicates a platform of substantially semicircular shape, supported upon the braces 19, which are fixed to and which project radially from the standard 13. These braces 19 are connected with the standard 13 by means of metal straps 20, and the width of the platform from the standard 13 radially is substantially the same as the width of the gateway in the fence.

On the periphery of the platform 18 is a series of uprights 21, rigidly secured in position by means of the metal straps 22, secured to the under surface of the braces 19 and passed around the outer surface of the uprights 21 to project a slight distance above the said uprights, and these straps are perforated at their upper ends for purposes hereinafter made clear. The uprights are further braced and supported in position by means of the straps 23, which engage the top of the platform 18 and the inner surface of the uprights 21. Attached to the uprights 21 are the rails 24 to form a fence or inclosure surrounding the platform 18 except at its ends.

I support the periphery of the platform 18 against sagging or downward movements as follows:

The reference-numeral 25 indicates a pair of arms fixed to and projecting outwardly from the top portion of the standard 13. These arms are supported by means of the rods 26, whose upper ends are fixed to a collar 27 on the standard 13 and whose lower ends pass through slots 28 in the outer ends of the arms 25, and on the lower ends of the rods 26 are formed the loops 29. The rods 30 are hooked to the loops 29 and also to the perforated upper ends of the straps 22. By this means the weight of the outer end of the platform is supported from the top of the upright.

The reference-numeral 31 indicates a wire or rod connected with one of the posts 14 and attachably connected at its other end with a part of the swinging platform.

In practical use and assuming that a wagon-load of animals is to be unloaded into the stock-yard or inclosure the wagon is driven to a position parallel with the fence and with its rear end adjacent to the standard 13. I then move the swinging platform in a horizontal plane until its outer end stands adjacent to the rear end of the wagon. This, obviously, may be easily done, because the platform moves in a horizontal plane upon the pivoted standard. Then when the outer end of the platform is in position adjacent to the rear end of the wagon I lock it in this position by means of the wire or rod 31. Then the animals may safely pass from the wagon to the stock-yard or inclosure, and when they have all left the swinging platform I unhook the wire or rod 31 and swing the platform to the position shown in Fig. II, thereby closing the gateway in the fence. Obviously the process of unloading a wagon-load of animals may be accomplished very quickly and easily, and the wagon need not be backed. Furthermore, the swinging chute cannot injure the animals in any way, either when opening or closing, as would be the case if the chute were swung in a vertical plane. Another material advantage which I attain is when the swinging chute is in position for loading or unloading stock from the wagon it is obvious that if the wagon should move backwardly the chute will follow it, and therefore it will not be broken or torn loose from its fastenings, as would a chute arranged to swing vertically.

Having thus described my invention, what I claim, and desire to secure by Letters Patent of the United States therefor, is—

1. An improved swinging animal-chute, comprising in combination a fence having an opening therein, the pivoted standard near one edge of the opening, a substantially semicircular platform fixed to the pivoted standard, a fence surrounding the periphery of the semicircular platform, said parts being so arranged and proportioned that in one position the opening through the fence will be closed by the fence on the swinging platform and in another position a passage-way will be provided over the platform and through the gate-opening.

2. An improved swinging animal-chute, comprising in combination a fence having a gate-opening therein, a sill resting on the ground-surface, an upright standard rotatively mounted upon the sill, means for pivotally supporting the upper end of the standard, a series of braces projecting radially from the lower portion of the standard, the straps for holding these braces to the standard, a semicircular platform mounted on said braces, uprights at the outer ends of the braces, a metal strap for each upright having its upper end perforated and having its body portion extended along the outer surface of the uprights and along the under surface of the braces, brace-straps for each upright fixed at one end to the upright and at its other end to the top of the platform, a number of arms fixed to the top portion of the standard and slotted at their outer ends, a collar fixed to the top of the standard, a number of rods fixed at their upper ends to the said collar passed through the slots in the arms and having loops at their lower ends, a number of rods hooked at their upper ends into said loops and connected at their lower ends with said perforated straps and means for securing the swinging platform to a stationary support to hold it in a fixed position.

E. MYERS.

Witnesses:
J. A. ALLISON,
J. W. STIFFLER.